US005918728A

United States Patent [19]
Syverson

[11] Patent Number: 5,918,728
[45] Date of Patent: Jul. 6, 1999

[54] GEARLESS MOTORIZED ROLLER WITH VARIABLE FREQUENCY CONTROLLER

[75] Inventor: Charles D. Syverson, North Mankato, Minn.

[73] Assignee: Motion Systems, L.C.L.L.C., White Lake, Wis.

[21] Appl. No.: 08/931,593

[22] Filed: Sep. 16, 1997

[51] Int. Cl.[6] .................................................. B65G 13/06
[52] U.S. Cl. .......................................... 198/788; 198/784
[58] Field of Search ................................. 198/784, 788; 310/179, 180, 24

[56] References Cited

U.S. PATENT DOCUMENTS

| | | |
|---|---|---|
| 1,448,712 | 3/1923 | Pool . |
| 1,743,223 | 1/1930 | Löwy . |
| 1,825,119 | 9/1931 | Mug . |
| 1,889,173 | 11/1932 | Drexler . |
| 2,013,858 | 9/1935 | Lawlor ..................................... 198/218 |
| 2,175,860 | 10/1939 | Waimann ................................ 198/127 |
| 2,915,167 | 12/1959 | Berger ..................................... 198/127 |
| 4,047,609 | 9/1977 | Nazuka ................................... 198/690 |
| 4,082,180 | 4/1978 | Chung ..................................... 198/835 |
| 4,998,052 | 3/1991 | Erdman et al. .......................... 318/701 |
| 5,022,513 | 6/1991 | Huber ...................................... 198/782 |
| 5,025,915 | 6/1991 | Huber ...................................... 198/782 |
| 5,030,864 | 7/1991 | Van Hout et al. ....................... 310/179 |
| 5,033,611 | 7/1991 | Huber ...................................... 198/782 |
| 5,088,596 | 2/1992 | Agnoff .................................... 198/788 |
| 5,127,513 | 7/1992 | Huber ...................................... 198/782 |
| 5,131,527 | 7/1992 | Huber ...................................... 198/782 |
| 5,180,344 | 1/1993 | Hall ......................................... 474/148 |
| 5,336,956 | 8/1994 | Haner ...................................... 310/179 |
| 5,413,209 | 5/1995 | Werner .................................... 198/500 |
| 5,462,156 | 10/1995 | Kobayaski et al. ..................... 198/788 |
| 5,548,173 | 8/1996 | Stephenson ............................. 310/181 |

FOREIGN PATENT DOCUMENTS

| | | | |
|---|---|---|---|
| 2616418 A1 | 6/1987 | France . | |
| 54-159982 | 12/1979 | Japan .................................... 198/788 |
| 3-98905 | 4/1991 | Japan .................................... 198/784 |
| 1486199 | 6/1989 | U.S.S.R. . | |

OTHER PUBLICATIONS

Somfy, Power Moller 8 page brochure, Somfy Systems, Inc., Aug. 16, 1993.
"ITOH Power Moller® J–Series, JY–Series," Somfy Systems, Inc., Cranbury, NJ, 4 pages.
"ITOH Power Moller® S–Series," Somfy Systems, Inc., Cranbury, NJ, 4 pages.

*Primary Examiner*—William E. Terrell
*Assistant Examiner*—Mark Deuble
*Attorney, Agent, or Firm*—Lathrop & Clark LLP

[57] ABSTRACT

A drive roller for a conveyor is rotated by a brushless D.C. motor without any intervening gear reducer. The drove roller has a laminated metal stator with at least three windings external to the stator core. The stator is fixed to a rigid axially extending shaft which supports a roller tube and a permanent magnet rotor on bearings. The rotor is fixed to the roller tube and closely spaced from the stator. A variable frequency power supply controls the induced magnetic field in the stator to control the rotational speed of the drive roller.

14 Claims, 1 Drawing Sheet

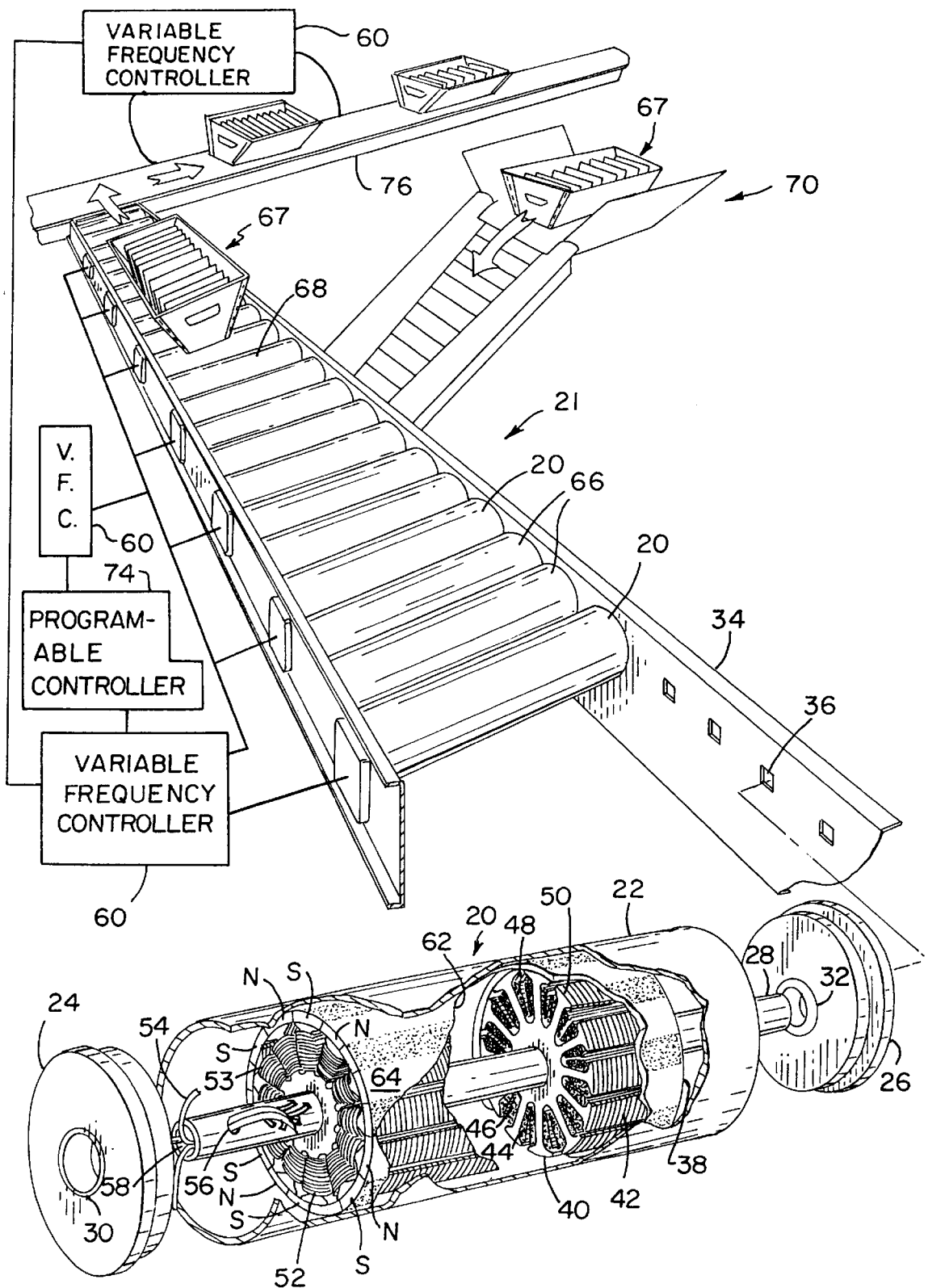

GEARLESS MOTORIZED ROLLER WITH VARIABLE FREQUENCY CONTROLLER

FIELD OF THE INVENTION

The present invention relates to roller conveyors and motorized rollers used to move packages along roller conveyors.

BACKGROUND OF THE INVENTION

Roller conveyors are used to move packages, trays, or containers where accumulation of individual containers is required. Roller conveyors may be advantageously used when items are accumulated from a number of locations and dispatched to multiple destinations. For example in moving sorted mail contained in trays from sorting locations to a loading dock where mail destined for a particular vehicle or container is accumulated. Roller conveyors consist of a roller tube which is mounted for rotation about the cylindrical axis of the roller. The rollers are spaced on the conveyors so that the minimum sized package is supported by at least three rollers at all times. Drive rollers are positioned between idler rollers and used to move and stop packages on the conveyor. The spacing and number of drive rollers relative to idler rollers depends on the size of the packages anticipated and the torque or drive force which is required. With groups of drive rollers may be used if greater drive forced is required.

Although drive rollers may be driven by belts from external motors, the typical modern approach is to use rollers with internal electric motors which are mounted to a fixed shaft and drive the roller through a gear system. The use of internal-motor-driven rolls simplifies the assembly of the roll conveyor and eliminates a large number of pulleys and external motors which occupy space and require guards to protect workers.

Roller conveyors can be used to precisely control the motion of many packages with each motor under the control of a central computer or programmable controller. By controlling the individual drive motors a package can be moved forward or can be brought to a stop by using the drive rollers as a brake. The rollers can operate individually or as an integrated system to accumulate packages with zero pressure, and release packages in a slug release or singulation mode. A roller conveyor can be used to combine streams of packages onto a single conveyor going to a single or multiple destinations. Packages on a first conveyor line which intersects a second conveyor line can be held and injected one by one as space becomes available on the second conveyor. Thus the conveyors will typically be used with multiple sensors which sense the passage of discrete packages, and a controller which is designed and programmed for a particular application.

Standard rollers of both the drive, and idler types are 1.9 inches in diameter. The drive rollers are typically supplied as a sealed unit and utilize small high speed brush motors. The roller sealed units are typically disposed of when the brushes wear out. The typical life of a drive roller and motor unit is less than 2,000 hours. A typical drive roller costs $90.00 and has a service life of less than one year. Although units using brushless D.C. motors are known, the life of the units is still limited by the life of the gears which drive the roller tube.

Cost is a very important consideration in the design of drive rollers for roller conveyors. A typical installation may contain hundreds to thousands of feet of conveyor and, with one drive roller spaced every two to three feet, the number of drive rollers which must be purchased yearly to maintain such a system can be a considerable expense.

What is needed is a drive roller with a longer life and a lower cost.

SUMMARY OF THE INVENTION

The drive roller of this invention utilizes a brushless D.C. motor which has a stator or armature mounted on a fixed shaft which directly drives a permanent magnet rotor mounted inside a roller tube. A variable frequency drive supplies three-phase 24-volt power to a Y-connected three phase winding which is composed of three groups of four coils. Thus twelve electromagnets are formed which drive the permanent magnet rotor which has sixteen poles. The brushless D.C. motor is of a modular design and can be easily built in two inch length increments to supply 2 lb-in of torque for each two-inch increment. The variable frequency controller operates at a relatively low frequency of 15–75 Hz. Because of the low drive frequency, hysteresis losses in the armature laminations are extremely low and ordinary mild steel can be used to form them. The armature laminations making up the brushless D.C. motor core are also relatively thick because of the relatively low power necessary to drive the motor and the resultant relatively low eddy currents present in the motor core. For a motor with a 4.0 lb-in design torque and a rotor and stator length of four inches, the current draw will be approximately 0.8 amps consuming about 15 Watts of power. The motor will drive the roller at approximately 265 rpm which corresponds to a conveyor speed of approximately two feet per second or 120 feet per minute.

Because the only moving parts of the drive roller are the bearings, which have a life of approximately 100,000 hours, the overall life of the drive unit is expected to be considerably more then ten times that of conventional units. In addition, the cost of the units is expected to be less than existing units because of the elimination of gears and brushes. The motor itself utilizes low-cost ferrite magnets in the rotor and low-cost armature cores utilizing mild steel and relatively few laminations. Further, the construction of the motor is simple because the windings are inserted into the core from the outside of the core and thus are cost-effectively manufactured.

It is an object of the present invention to provide a drive roller for a roller conveyor which has a longer operational life.

It is a further object of the present invention to provide a drive roller for a roller conveyor which is designed for cost-effective production.

It is another object of the present invention to provide a drive roller the drive speed of which can be precisely controlled.

It is also an object of the present invention to provide a drive roller for a roller conveyor which can be used to position articles on a roller conveyor.

Further objects, features and advantages of the invention will be apparent from the following detailed description when taken in conjunction with the accompanying drawings.

BRIEF DESCRIPTION OF THE DRAWING

The FIGURE is an exploded perspective view of a drive roller of this invention, partially broken away in section, and shown in relation to a conveyor with a schematic illustration of the control system therefor.

DESCRIPTION OF THE PREFERRED EMBODIMENT

Referring more particularly to the FIGURE, wherein like numbers refer to similar parts, a number of drive rollers 20 are mounted in a frame 34 along with idler rollers 66 to form a roller conveyor 21. Each drive roller 20 has a stator 40 with Y-connected windings which is fixed to an axially extending shaft 28 which supports a roller tube 22 and permanent magnet rotor 62 on bearings 30, 32. Each roller tube 22 is sealed with a first end cap 24 and second end cap 26. The roller tube 22 is mounted for rotation on the shaft 28 by first bearings 30 and second bearings 32 which are mounted in the first end cap 24, and the second end cap 26 respectively. The drive roller shaft 28 extends through and beyond the end caps 24, 26 on both ends of the tube 22 and extends into holes 36 in the frame 34. The ends of the shaft 28 are preferably nonround to engage fixedly within the frame holes 36 to prevent rotation of the shaft.

An brushless D.C. motor 38 is contained within the roller tube 22 the motor has a stator 40 mounted to the shaft 28. The stator 40 consists of forty laminations 42 which form a core 44 on which coils 52 are wound. The laminations 42 are approximately $1/10$th of an inch thick and are constructed of mild steel to minimize cost. The core 44 constructed from the laminations 42 has twelve slots 48 separated by T-shaped core posts 50. Three groups of four coils 52 are wound on the core 44. Each coil consists of 65 turns of No. 26 copper wire. The four coils 52 of each group are positioned sequentially with coils of the other two groups so that no two coils from the same group are adjacent, but alternate in regular order as is conventional for the windings of an electric motor. Each group of four coils is wound from a single wire 53 which has two ends 54. The three wires are connected together at a first end 54 of the single wires 53 to form a Y-connected winding, and the other ends 54 of the wires 53 are the leads through which one of three phases of electric power is supplied.

The construction of the stator 40 facilitates low cost fabrication by allowing the wires 53 forming the winding 52 to be inserted through slots 46 between the T-shaped core posts 50. Because the slots are on an outwardly facing portion of the stator 40, they are easily accessed for automatic winding of the wires 53 within the slots 46. This allows the use of lower cost machinery which can operate at higher speeds.

The ends 54 of the wires 53 are led through a hole 56 in the side of the shaft 28. The hole 36 leads to an axial bore 58 which allows the wires to pass through the center of the shaft 28 and through the bearing supporting the shaft. The ends 54 of the wires 53 are connected to a variable frequency controller 60. The variable frequency controller 60 supplies three phase twenty-four volt current to the windings on the core 44 of the motor 38.

A permanent ferrite magnetic shell 64 serves as the rotor 62 of the drive roller motor 38. The shell 64 has sixteen poles: eight north N, and eight south S. The 3/4 ratio between stator electromagnetic poles and the rotor permanent magnetic poles helps to minimize losses in the motor.

The roller tube 22 will typically have a diameter of 1.9 inches, which is the industry standard for roller conveyors, and typically will have a length of at least ten inches. The ferrite magnetic shell 64 is bonded to the interior of the roller tube 22 by an adhesive, for example adhesive 2214 available from the 3M Corporation.

Current is supplied to the windings as is conventionally done in electric motors so that the induced electromagnets formed by the windings on the core react against the magnetic field of the permanent magnets of the shell 64 causing the magnetic shell and the affixed roller tube 22 and end caps 24, 26 to rotate about the shaft 28 on the bearings 30, 32. The design of the motor will produce approximately four inch-pounds of torque. The motor is designed for a velocity of approximately 265 rpm at full speed. This corresponds to roller surface speed of about 2.2 ft/s or about 1.5 miles per hour. The velocity of the rollers can be controlled or decreased by varying the frequency of the drive current between fifteen and seventy-five Hertz more typically between thirty and fifty Hertz.

Drive rollers 20 are interspersed on the frame 34 intermediate between one or more like diameter idler rollers 66. The idler rollers 66 are similar in overall construction to the drive rollers 20, except that they do not contain a motor and are not driven. Roller conveyors 21 are designed so that the particular packages, boxes or trays 67 which are moved along the conveyor surface 68 are supported at all times by at least three rollers—either drive rollers 20 or idler rollers 66. The spacing of the drive rollers 20 is typically such that only one is engaged with a tray 67 at a time. For example, if the trays 67 are about thirty inches long, the drive rollers 20 could be spaced about three feet apart so that only one drive roller 20 is engaged with a tray 67 at one time.

The design of the conveyor system 70 allows the position of individual trays 67 to be controlled. The presence and placement of a tray 67 can be detected with conventional sensors (not shown). A programmable controller 74 utilizing information from conventional sensors causes a particular package to be accelerated and moved or stopped at a particular location by using the controlled drive rollers 20 to drive and brake individual trays 67. If a tray 67 is by chance not positioned directly over a drive roller 20 an adjacent tray can be used to push it.

Roller conveyors are particularly useful when it is desirable to queue up packages and then introduce individual packages from one conveyor 21 onto another conveyor 76 as space becomes available on the target conveyor.

Roller conveyor systems can be extremely large and complicated, as, for example, are those systems used by the United States Postal Service at major sorting hubs. At these postal hubs mail is sorted by destination and loaded onto trays. A roller conveyor system will utilize a programmable controller to move sorted mail to distant points where mail going to a common destination can be loaded on a single truck or into a single container for transport to that destination.

The construction of the drive roller 20 of the present invention discussed above may be varied to obtain drive rollers of varying torque. By fabricating the permanent magnet shell in two inch lengths the motor's drive power can be increased or decreased by using one, two, or three magnetic shell sections. If a design having a torque of two inch-pounds is desired, thirty-three core laminations are used and 130 turns of No. 29 copper wire are used in each coil. If on the other hand, a torque of six inch-pounds is desired, three magnetic shell sections are aligned axially along the shaft and the core of the stator is formed with ninety-nine laminations and the coils are wound with 42 turns of No. 24 copper wire.

The construction of the motor 38 is designed to minimize cost and maximize reliability. Reliability is enhanced by the reduction in the number of wearing moving parts. The only parts subject to wear are the bearings, which rotate with respect to the rigid shaft. There is no wear between the rotor and the stator, because the magnetic shell is supported in closely spaced relation to the stator. Bearings typically have a wear life in the range of one-hundred thousand hours, which is much longer than the wear life of conventional gears and brushes. The design of the motor 38 allows for the use of low-cost components, i.e.: ordinary mild steel for the laminations and relatively thick laminations which minimizes the number of laminations which must be formed. The stator design allows the armature to be wound on the outside of the stator which minimizes fabrication costs. The rotary low power requirements allows conventional ferrite magnets of low cost to be used. Of course using higher grade magnets would improve motor efficiency at somewhat higher cost. Efficiency is normally not a large concern in the design of roller conveyors from a cost standpoint because of the relatively small amount of power consumed. Efficiency is important, however, in maintaining the rolls at a low temperature. It is generally desirable to keep the surface of the roller tube 22 below about 110 degrees Fahrenheit to prevent material used in packaging from melting and adhering to the drive rollers.

It should be understood that in addition to increasing the power of the motor in a single drive roller it is also possible to group rollers together to increase the amount of driving force available.

It should also be understood that the motor 38 can be constructed to operate on variable frequency power having two or more phases of drive current. In addition, the number of coils, number of wires, and number of turns per coil, together with wire gauge are design variables, which will vary with the number of drive current phases, and the voltage of the drive current, used with the motor, and the amount of torque for which the motor is designed It is understood that the invention is not limited to the particular construction and arrangement of parts herein illustrated and described, but embraces such modified forms thereof as come within the scope of the following claims.

I claim:

1. A drive roller and roller controller for a roller conveyor comprising:

a shaft rigidly mounted to a conveyor support;

a stator having a core and twelve windings on the core, the stator being mounted about the shaft;

a roller tube surrounding the shaft and the stator, the roller tube having an interior, a first end and a second end, and an exterior surface having a diameter of 1.9 inches;

a first tube closure mounted to the roller tube first end, and a second tube closure mounted to the roller tube second end, the tube closures being rotatably mounted on the shaft to rotatably mount the roller tube on the shaft;

a permanent magnet rotor having sixteen poles which alternate North and South, the rotor being fixedly mounted to the roller tube interior and overlying and coaxial with the stator, the rotor and the stator forming a brushless three phase motor, with the rotor and the fixedly mounted roller tube being driven by changes in induced magnetic fields in the stator; and a variable frequency controller in power supplying connection to the windings of the stator for controlling the rotation speed of the rotor.

2. The drive roller and roller controller of claim 1 wherein the motor core is about two inches long and produces about two lb-in of torque, and wherein the core contains about thirty-three laminations and the windings have about 130 turns of wire per coil.

3. The drive roller and roller controller of claim 1 wherein the motor core is about 4 inches long and produces about four lb-in of torque and wherein the core contains about sixty-six laminations and the windings consist of about 65 turns of wire per coil.

4. The drive roller and roller controller of claim 1 wherein the motor core is about 6 inches long and produces about six lb-in of torque and wherein the core has about 99 laminations and the windings consist of about 42 turns of wire per coil.

5. The drive roller and roller controller of claim 1 wherein the rotor permanent magnet is of the ferrite type.

6. The drive roller and roller controller of claim 1 wherein the variable frequency controller provides a voltage of about 24 volts.

7. A drive roller adapted for use in a roller conveyor and adapted to be driven with a variable frequency power supply, the drive roller comprising:

a shaft adapted for rigid mounting to a conveyor support;

a stator having a core and twelve windings on the core, the stator being mounted about the shaft;

a roller tube surrounding the shaft and the motor stator, the roller tube having an interior and having a first end and a second end and an exterior surface having a diameter of 1.9 inches;

two tube closures, one rigidly mounted to each of the first end and the second end of the roller tube, wherein the tube closures are rotatably mounted on the shaft so that the roller tube rotates on the shaft; and a permanent magnet rotor having sixteen poles, which alternate North South, the rotor fixedly mounted to the roller tube interior and over and coaxial with the stator, the permanent magnet rotor and the stator forming a brushless D.C. motor, such that the rotor and fixedly mounted roller tube are driven by changes in induced magnetic fields in the stator.

8. The drive roller of claim 7 wherein the motor core is about two inches long and produces about two lb-in of torque, and wherein the core contains about thirty-three laminations and the windings consist of about 130 turns of wire per coil.

9. The drive roller of claim 7 wherein the stator core is about 4 inches long and produces about four lb-in of torque and wherein the core contains about sixty-six laminations and the windings consist of about 65 turns of wire per coil.

10. The drive roller of claim 7 wherein the stator core is about 6 inches long and produces about six lb-in of torque and wherein the core has about ninety-nine laminations and the windings consist of about 42 turns of wire per coil.

11. The drive roller of claim 7 wherein the rotor permanent magnet is of the ferrite type.

12. The drive roller of claim 7 wherein the core of the stator is constructed of laminations of mild steel.

13. A roller conveyor system comprising:

a frame;

a multiplicity of idler rollers positioned for rotation on the frame;

a plurality of drive rollers positioned on the frame, each drive roller having a rigid shaft fixed to the conveyor frame; a stator having a core and at least three windings on the core, the stator being mounted about the shaft, the stator mounted about the rigid shaft; a roller tube surrounding the shaft and the stator, and having a first and a second end and an interior; two tube closures, one tube closure rigidly mounted to each of the first end and the second end of the roller tube, wherein the tube closures are rotatably mounted on the shaft, to rotatably mount the roller tube on the shaft; and a permanent magnet rotor having a plurality of poles, the rotor fixedly mounted to the roller tube interior and overlying and coaxial with the stator, the permanent magnet rotor and the stator forming a brushless three-phase D.C. motor, with the rotor and connected roller tube being driven by changes in induced magnetic fields in the stator;

a plurality of variable frequency three-phase power supply controllers for controlling the rotation speed of each drive roller, each variable frequency controller connected to one of said multiplicity of drive rollers for controlling the rotation speed of the connected drive roller rotor; and a programmable controller operably connected to the variable frequency controllers to control the speed of all the drive rotors.

14. The drive roller of claim 13 wherein the roller tube has an exterior surface having a diameter of 1.9 inches.

* * * * *